Patented Aug. 18, 1931

1,819,018

UNITED STATES PATENT OFFICE

JOHAN AXEL ERIKSSON, OF STOCKHOLM, SWEDEN

METHOD OF MANUFACTURING POROUS MATERIAL FROM PORTLAND CEMENT

No Drawing. Application filed March 27, 1923, Serial No. 628,143, and in Sweden July 26, 1920.

It is previously known that a porous material can be manufactured from cement by mixing the same with a pulverous metal which is adapted to generate gas from cement in the presence of water, such as aluminium, zinc, etc. Hithertofore, such pulverous metal has been added to the cement mixed with a mortar which has been manufactured with sand.

However, it has been found that this addition of sand offers several inconveniences. In spite of the addition of sand the cement mortar will be so "fat" that salt eruptions will be formed on the surfaces of the bricks formed from such material, and moreover it has been impossible to obtain a uniform product since the heavy sand will sink to the bottom before the mass has hardened.

The method forming the object of this invention makes it possible to avoid these inconveniences. The method consists in adding to the cement a mixture of so called "shale-lime" or alum-shale lime and a pulverous metal which is adapted to develop gas from the cement in the presence of water, such as aluminium, zinc or magnesium. Bituminous or carboniferous shale-lime is an intimate finely divided mixture of shale ashes and lime and may contain different proportions of shale ashes and lime, for instance 50% by weight of each or 60% by weight of lime and 40% of weight of shale ashes. Shale ashes and lime should preferably first be finely pulverized separately and then be ground together.

When the gas generating metal powder is added to the cement together with shale-lime the product obtained will get a high degree of porosity and a uniform composition which is due to the fact that the whole mass consists of a finely divided binding agent and water. The mass will thus not contain any heavy coarse particles which will sink to the bottom but only very light and fine particles which will remain uniformly suspended in the liquid mass during the hardening of the same. Moreover, the shale-lime will not cause any salt eruptions on the surfaces of the bricks formed from the mass as the shale will bind the salts. Moreover, the addition of shale-lime offers the advantage that the cement can be mixed with the same without the strength of the same being diminished.

A pulverous metal of the kind described is introduced into the mixture of raw materials in very small quantities, generally in quantities less than 1 per cent. The introduction of the same may be executed at any state of the manufacture of the mixture of raw materials but it ought to be ground together with the latter so that an intimate mixture is effected. When water is then added to the pulverous mixture a chemical reaction is effected due to which great quantities of gas are generated which causes an increase of the volume of the mass. This takes place before the "binding" begins and when the material then has hardened a porous stone-like material is obtained.

The water should preferably be added at a somewhat elevated temperature, say 25–40° C., in order that the reaction may take place more rapidly and a higher quantity of gas may be produced. In order to reduce the period for the "binding" of the mass it is convenient to add substances adapted for said purpose, such as sodium carbonate, gypsum and so called aluminate cement. The latter which causes a very rapid binding (hardening) should be added in minute quantities, for instance 2 to 5%.

*Examples of the composition*

(1) 70–85% by weight of stale-lime, 15–30% of Portland cement, 0,25% of zinc powder and 50–100% of water.

(2) 60–80% of cement, 40–20% of stale lime, 0,15% of aluminium powder and 40–80% of water.

The material manufactured according to the present invention will get a high degree of porosity and the pores will be fully separated from one another by means of partition walls. Due to this fact the air cannot circulate through the material since the different cells containing the generated gas are wholly closed. The material will get a very low specific gravity, for instance 0,5. Due to the high porosity of the product relatively small quantities of the raw materials are required for the manufacturing and, in addition, since the exterior walls, partition walls or other parts of buildings which are erected from the bricks in question become very light the further advantage is gained that simpler and cheaper building constructions than hithertofore can be used.

The material in question also has a high heat insulating power, wherefore it is very convenient to use the same for erecting exterior walls of buildings. It is also easily shapable so that it can be moulded to bricks, plates and the like, or even complete walls can be moulded by the same. Besides exterior walls or partition walls the material can be used for the construction of frame works so replacing hollow bricks. It has a high strength which may be increased by decreasing the degree of porosity.

The material can easily be sawed and cut, especially so just after having been manufactured, i. e. when the resistance is still rather low. Therefore it is convenient to manufacture bricks or plates from the material in question in such a manner that large blocks, for instance 10 x 10 x 0,5 meters, are first moulded, said blocks being then sawed or cut to bricks or plates of the desired size. Hereby the advantages are gained that the bricks or plates can be manufactured at a lower price than if they should be moulded directly, that their surfaces become very smooth and that they can be made of exact measures.

I claim:

1. A cementitious composition adapted to form a porous material on mixing with water and subsequent setting, comprising cement, shale ashes, lime, and a metal adapted to react with the other ingredients to generate a gas when the said composition is mixed with water.

2. A cementitious composition adapted to form a porous material on mixing with water and subsequent setting, comprising cement, an intimate mixture of shale ashes and lime, and a metal adapted to react with the other ingredients to generate a gas when the said composition is mixed with water.

3. A cementitious composition adapted to form a porous material on mixing with water and subsequent setting, comprising about 60–85% cement, about 40–15% of an intimately ground mixture of shale ashes and lime, and a small amount of a metallic powder adapted to react with the other ingredients to generate a gas when the said composition is mixed with water.

In testimony whereof I have affixed my signature.

JOHAN AXEL ERIKSSON.